(12) United States Patent
Hsu et al.

(10) Patent No.: US 6,483,975 B1
(45) Date of Patent: Nov. 19, 2002

(54) POSITIVE DISPERSION OPTICAL FIBER HAVING LARGE EFFECTIVE AREA

(75) Inventors: Lucas Hsu, Allentown, PA (US); David W Peckham, Lawrenceville, GA (US); William Alfred Reed, Summit, NJ (US); Man Fei Yan, Berkeley Heights, NJ (US)

(73) Assignee: Fitel USA Corp., Norcross, GA (US)

( * ) Notice: Subject to any disclaimer, the term of this patent is extended or adjusted under 35 U.S.C. 154(b) by 75 days.

(21) Appl. No.: 09/844,643

(22) Filed: Apr. 27, 2001

(51) Int. Cl.⁷ .................................................. G02B 6/02
(52) U.S. Cl. ........................ 385/123; 385/124; 385/127
(58) Field of Search ................................ 385/123, 124, 385/126, 127, 128, 142, 144; 65/385

(56) References Cited

U.S. PATENT DOCUMENTS

| | | | |
|---|---|---|---|
| 4,852,968 A | 8/1989 | Reed | 385/127 |
| 5,742,723 A | * 4/1998 | Onishi et al. | 385/127 |
| 5,761,366 A | * 6/1998 | Oh et al. | 385/127 |
| 6,317,551 B1 | * 11/2001 | Mitchell et al. | 385/124 |

FOREIGN PATENT DOCUMENTS

| | | |
|---|---|---|
| EP | 0 789255 | 8/1997 |
| WO | 00 65387 A | 11/2000 |
| WO | 01 11402 A | 2/2001 |

OTHER PUBLICATIONS

T. Kato, et al., "Ultra–low nonlinearity low–loss pure silica core fibre for long–haul WDM Transmission," Electronics Letters Online, No. 19991094, Aug. 3, 1999.

T. Naito, et al., "1 Terabit/s WDM Transmission over 10,000km," Proceedings of the 25$^{th}$ European Conference on Optical Communication, Sep. 1999, Nice, France.

Specification for Pure Silica Core Single Mode Optical Fiber, No. 6HF2–00521, Sumitomo Electric Industries, Ltd., Apr. 2000.

E. Sasaoka, et al., "Design optimization of SMF–DCF hybrid transmission lines for long haul large capacity WDM transmission systems," Asia–Pacific Conference on Communications, APCC OECC Proceedings, Oct. 1999, Beijing, China.

Reed, et al., "Tailoring Optical Characteristics of Dispersion–Shifted Lightguides for Applications Near 1.55 M," AT&T Technical Journal, vol. 65, No. 5, Sep. 1, 1986.

* cited by examiner

Primary Examiner—Robert H. Kim
Assistant Examiner—Therese Barber
(74) Attorney, Agent, or Firm—John M. Harman

(57) ABSTRACT

Embodiments of the invention include an optical communications system including one or more optical transmission devices, one or more optical receiving devices, and at least one positive dispersion optical fiber coupled therebetween. The fiber includes a doped core region with an index of refraction $n_1$, a cladding region with an index of refraction $n_2$, and first and second annular rings or regions therebetween with indices of refraction $n_3$ and $n_4$, respectively. The various regions are manufactured in such a way that the refractive index value ranges are: $0.14<(n_1-n_2)/n_2<0.31$, $-0.19<(n_3-n_2)/n_2<-0.02$, and $-0.20<(n_4-n_2)/n_2<-0.08$. The fibers exhibit a chromatic dispersion greater than $20\pm2.0$ ps/(nm-km) and a dispersion slope less than 0.062 ps/(nm²-km) at a wavelength of 1550 nm. Also, the fibers have a relatively large effective core area, $A_{eff}$, e.g., greater than $100.0\ \mu m^2$, and a relative dispersion slope (RDS) less than $0.0032\ nm^{-1}$. The mode field diameter (MFD) is at least $11.9\pm0.7\ \mu m$. These desirable transmission characteristics are achieved without many of the manufacturing and economic limitations of conventional fibers.

22 Claims, 5 Drawing Sheets

POSITIVE DISPERSION OPTICAL FIBER HAVING LARGE EFFECTIVE AREA

BACKGROUND OF THE INVENTION

1. Field of the Invention

The invention relates to positive dispersion optical fiber. More particularly, the invention relates to positive dispersion optical fiber having improved transmission characteristics including increased effective area.

2. Description of the Related Art

Optical fibers are thin strands of glass or plastic capable of transmitting optical signals, containing relatively large amounts of information, over long distances and with relatively low attenuation. Typically, optical fibers are made by heating and drawing a portion of an optical preform comprising a refractive core region surrounded by a protective cladding region made of glass or other suitable material. Optical fibers drawn from the preform typically are protected further by one or more coatings applied to the cladding region.

In an effort to improve the transmission capacity of optical fibers, wavelength division multiplexing (WDM) systems are used. In general, WDM systems multiplex a plurality of information channels onto a single fiber, with each channel operating at a different wavelength. To combat the inherent nonlinearity effects of interaction between channels (e.g., 4-photon mixing), many WDM system arrangements include a dispersion compensating arrangement including a positive dispersion fiber concatenated with a (negative) dispersion compensating fiber. The positive dispersion fiber typically comprises a single mode fiber with a small amount of dispersion to reduce the nonlinear interactions between channels. The dispersion compensating fiber tends to have a negative dispersion to reduce the introduced and otherwise accumulated dispersion.

However, dispersion compensating fibers tend to exhibit higher signal attenuation than non-dispersion compensating fibers. Thus, it is desirable for the positive dispersion fiber to have relatively low loss to reduce the overall attenuation of the dispersion compensating arrangement. Conventionally, low loss positive dispersion optical fibers exist. Such fibers include, e.g., the low loss, pure silica core fiber from Sumitomo Electric Industries, Ltd. See, e.g., "Ultra Low Nonlinearity Low Loss Pure Silica Core Fiber," Electronics Letters Online No: 19991094, Aug. 3, 1999.

However, it should be noted that the optical fibers disclosed in the above-referenced article have pure silica core regions, rather than more conventional optical fibers whose core regions are made of silica doped with, e.g., germanium dioxide ($GeO_2$). Optical fibers having pure silica core regions typically are more expensive than $GeO_2$-doped or other doped core fibers because, e.g., pure silica is more difficult and thus more expensive to process than Ge-doped silica. Also, pure silica core fibers have inherent difficulties associated with the depressed index cladding, e.g., the mismatch properties of the core and cladding make the fiber draw process more difficult.

Accordingly, it would be desirable to have an optical fiber, including a non-zero positive dispersion optical fiber having a relatively large effective area, that has the desirable transmission characteristics discussed hereinabove without the manufacturing and economic limitations of conventional pure silica core fiber.

SUMMARY OF THE INVENTION

The invention is embodied in an optical communications system including one or more optical transmission devices, one or more optical receiving devices, and at least one positive dispersion optical fiber coupled therebetween. Embodiments of the invention provide positive dispersion optical fiber that includes a doped core region with an index of refraction $n_1$, a cladding region with an index of refraction $n_2$, and first and second annular rings or regions with indices of refraction $n_3$ and $n_4$, respectively, formed between the doped core region and the cladding region. The various regions are manufactured in such a way that the refractive index value ranges are: $0.14<(n_1-n_2)/n_2<0.31$, $-0.19<(n_3-n_2)/n_2<-0.02$, and $-0.20<(n_4-n_2)/n_2<-0.08$. The core region is doped, e.g., with germanium or other suitable material. The first and second regions are down-doped, e.g., with fluorine or other suitable material. The cladding region is, e.g., pure silica. Positive dispersion fiber according to embodiments of the invention has a chromatic dispersion greater than 20±2.0 picosecond/(nanometer-kilometer) with a dispersion slope less than 0.062 ps/(nm²-km) at a wavelength of 1550 nm. Also, the mode field diameter (MFD) of the fiber is at least 11.9±0.7 microns ($\mu$m). Moreover, optical fiber according to embodiments of the invention has a relatively large effective core area, $A_{eff}$, e.g., greater than 100.0 $\mu m^2$, and a relative dispersion slope (RDS) less than 0.0032 nm⁻. Manufacture of the optical fiber includes manufacture of a core region with a width from approximately 6.0 $\mu$m to approximately 6.4 $\mu$m, a first annular region with a width from approximately 2.0 $\mu$m to approximately 4.1 $\mu$m, and a second annular region with a width from approximately 15.0 $\mu$m to approximately 35.0 $\mu$m. Optical fiber according to embodiments of the invention provides desired transmission characteristics such as relatively large effective core area and relatively low transmission loss at desired frequencies (e.g., 1550 nm) without being burdened by the manufacturing and economic limitations of conventional fibers.

BRIEF DESCRIPTION OF THE DRAWINGS

In the drawings:

FIG. 3b is a graphical diagram of a refractive index profile of the optical fiber shown in FIG. 3a;

FIG. 4b is a graphical diagram of a refractive index profile of the optical fiber shown in FIG. 4a;

DETAILED DESCRIPTION

Figure 1:
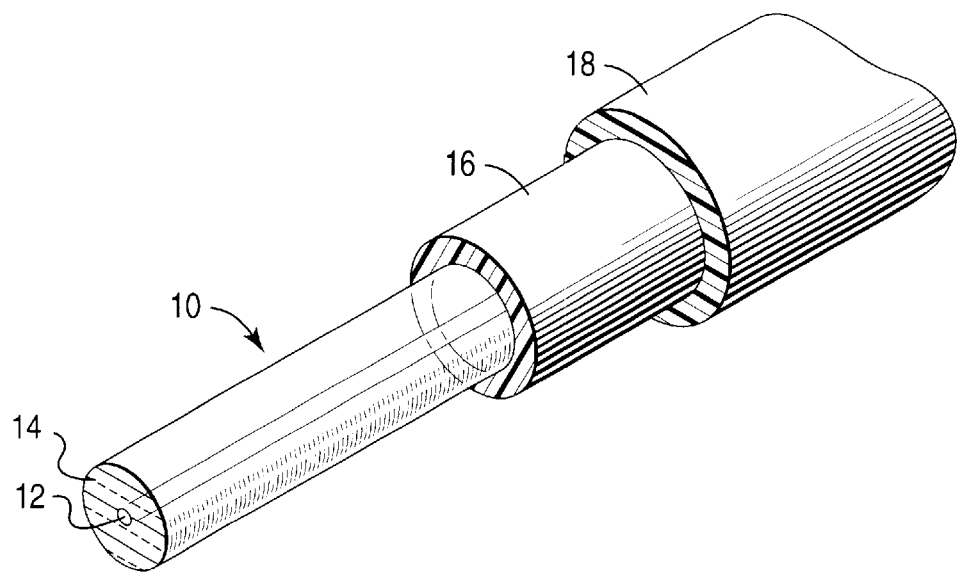
FIG. 1 is a perspective view of a coated optical fiber.

Commercially viable optical fibers involve the cooperation of numerous fiber design considerations. In general, it is desirable for the fiber transmission loss to be low; for the fiber to be able to tolerate a modest amount of bending without experiencing excessive loss; for the fiber to have a certain dispersion over a given wavelength range; for the dispersion slope to be relatively low; and for the fiber to have a cutoff wavelength that is appropriate for single mode transmission at the system wavelength. Although high quality glass materials have been developed that provide low transmission loss, high quality glass alone is insufficient to satisfy all the desirable features of commercially viable optical fibers.

Many desirable features are addressed, e.g., by the refractive index profile of the fiber, which shows how the index of refraction of the fiber varies as a function of distance from its central axis. Parameters used for describing the refractive index profile generally are referenced to the index of refraction of the outermost layer of glass. Idealized models of refractive-index profile typically comprise axially symmetric rings or regions of different refractive index. However, changing the number, size and/or shape of any one of these regions generally impacts more than one characteristic of the fiber (e.g., dispersion slope is reduced, but transmission loss is increased). Thus, it is a significant design effort to create a refractive index profile that provides most if not all of the desired features and yet still is readily manufacturable.

Optical fiber bandwidth is affected by many factors, including dispersion. For example, in multimode fiber, modal dispersion results when pulses of light that enter one end of the fiber are spread as they emerge from the other end of the fiber. Modal dispersion occurs because multimode fiber supports many different modes (paths) of a particular wavelength, and when the different modes are combined at the other end of the fiber, the net result is a spreading of the input pulse. Typically, modal dispersion is undesirable. Also, the term dispersion typically means chromatic or "linear" dispersion. Conventionally, the sign of the dispersion is positive when short-wavelength radiation has greater velocity than long-wavelength radiation.

Single mode fiber is optical fiber designed to support only the fundamental mode ($LP_{01}$) of a particular wavelength. Single mode fiber, which has a bandwidth that is much greater than multimode fiber, transmits optical signals at proportionally greater transmission rates. Nevertheless, single mode fiber behaves as though it is a multimode fiber for wavelengths that are shorter than the $LP_{11}$ cutoff wavelength, which is determined by the core radius (a), the index of refraction (n), and the fractional core/cladding index difference ($\Delta$). As $\Delta$ and a decrease, fewer and fewer modes propagate until only one mode propagates at wavelengths longer than the $LP_{11}$ cutoff wavelength. Accordingly, the $LP_{11}$ cutoff wavelength needs to be shorter, by a suitable amount, than the wavelengths to be transmitted.

Referring now to FIG. 1, shown is a coated optical fiber 10, e.g., an optical fiber in which embodiments of the invention are useful therewith. The optical fiber 10 includes a light-carrying core region 12 and a cladding region 14 surrounding the core region 12. The core region 12 and the cladding region 14 generally are made of glass and typically are drawn from a glass preform, as discussed previously herein.

The diameter of the core region 12 is approximately 5–8 $\mu$m for single mode fiber and approximately 50 or 62.5 microns ($\mu$m) for multimode fiber. Although the diameter of the core region 12 varies depending on whether the fiber is single mode or multimode, the total diameter of the cladding region 14 surrounding the core region 12 typically is approximately 125 $\mu$m.

The cladding region 14 is covered, for protection and strength, with one or more coatings, e.g., a primary coating layer 16 and a secondary coating layer 18, typically resulting in a total outer diameter of approximately 250–1000 $\mu$m. The secondary coating layer 18 generally has a relatively high modulus, e.g., $10^9$ Pascals (Pa), to withstand handling. The primary coating layer 16 has a relatively low modulus, e.g., $10^6$ Pa, to provide a cushion that reduces microbending losses.

Figure 2:
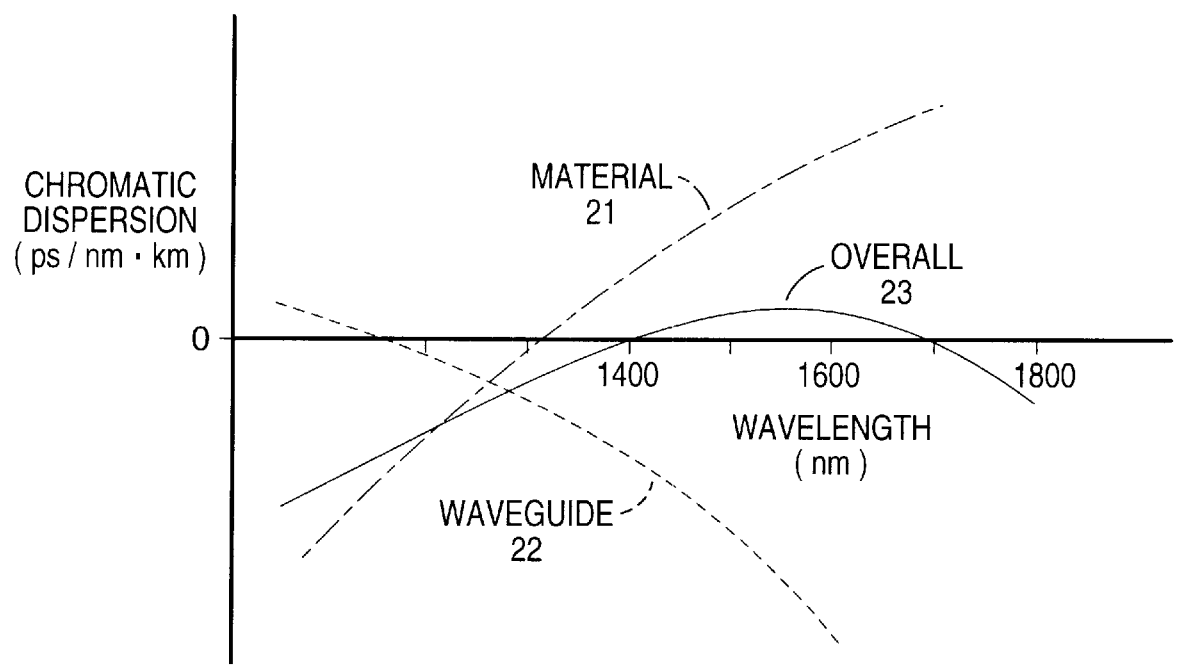
FIG. 2 is a graphical diagram of the overall chromatic dispersion of a dispersion-flattened optical fiber, as a function of wavelength, showing its material dispersion and waveguide dispersion components.

Referring now to FIG. 2, shown graphically is the chromatic dispersion of an optical fiber such as the optical fiber 10 shown in FIG. 1. In particular, FIG. 2 shows graphically how an overall dispersion-flattened characteristic 23 is created through the additive combination of material dispersion 21 and waveguide dispersion 22. Dispersion-flattened fibers generally have zero dispersion at two wavelengths, e.g., at 1400 nm and 1700 nm.

The material dispersion 21 is intrinsically associated with the actual material used in making the optical fiber. In FIG. 2, the material dispersion 21 is associated with silica glass. Waveguide dispersion 22 is a function of the refractive-index profile of the fiber. Unlike material dispersion, waveguide dispersion is affected, within limits, by the design engineer. The particular refractive-index profile that has yielded the overall dispersion-flattened characteristic 23 has been used in the design of dispersion-flattened fibers in which the chromatic dispersion is reduced over the broad wavelength region extending from 1400–1700 nm.

Figure 3A:
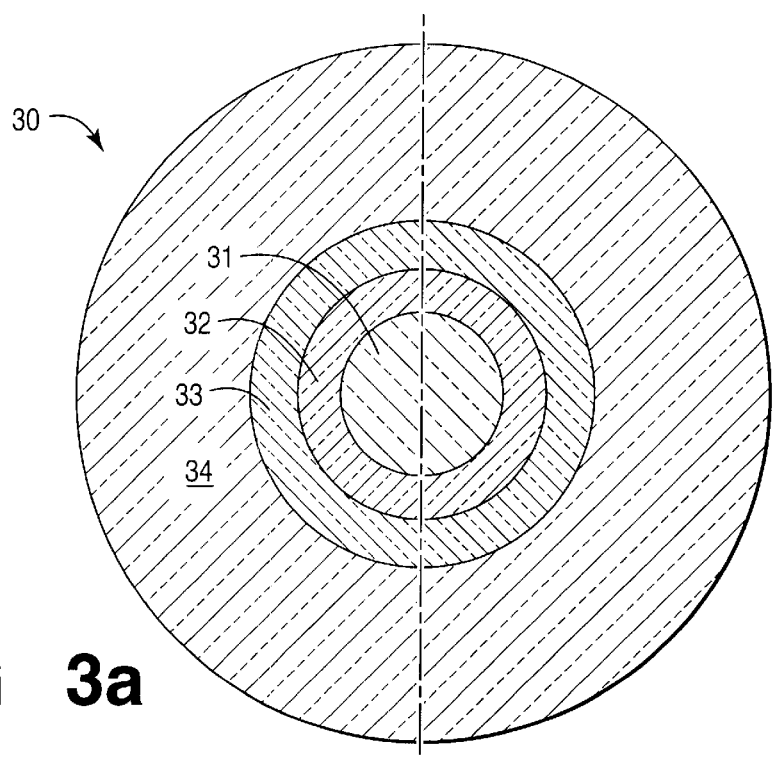
FIG. 3a is a cross-section view of an uncoated optical fiber, showing several layers of different refractive index materials.

Referring now to FIG. 3a, shown is a cross section of an uncoated glass fiber 30, showing an arrangement of a plurality of layers 31, 32, 33, 34, each having a different index of refraction for modifying the waveguide dispersion characteristic of the fiber 30. Although the layers 31–34 suggest that changes in refractive index are abrupt between layers, such is not necessarily the case. Typically, gradual index changes between adjacent layers are used, resulting in graded index fibers. However, to facilitate an understanding of embodiments of the invention, abrupt changes are shown. It is understood that embodiments of the invention contemplate graded index fibers.

The optical fiber 30 comprises a central core region 31, whose index of refraction nominally is $n_1$. The central core region 31 is surrounded by a first annular ring or region 32, which has a nominal refractive index $n_3$. The first region 32 is surrounded by a second annular ring or region 33, which has a nominal refractive index $n_4$. An outer cladding 34 of nominal refractive index $n_2$ surrounds the second region 33. It should be noted that FIG. 3a is not drawn to scale (the diameter of cladding layer 34 is approximately 125 $\mu$m, while the diameter of the core region 31 is approximately 8 $\mu$m, e.g., for single mode fiber).

Figure 3B:
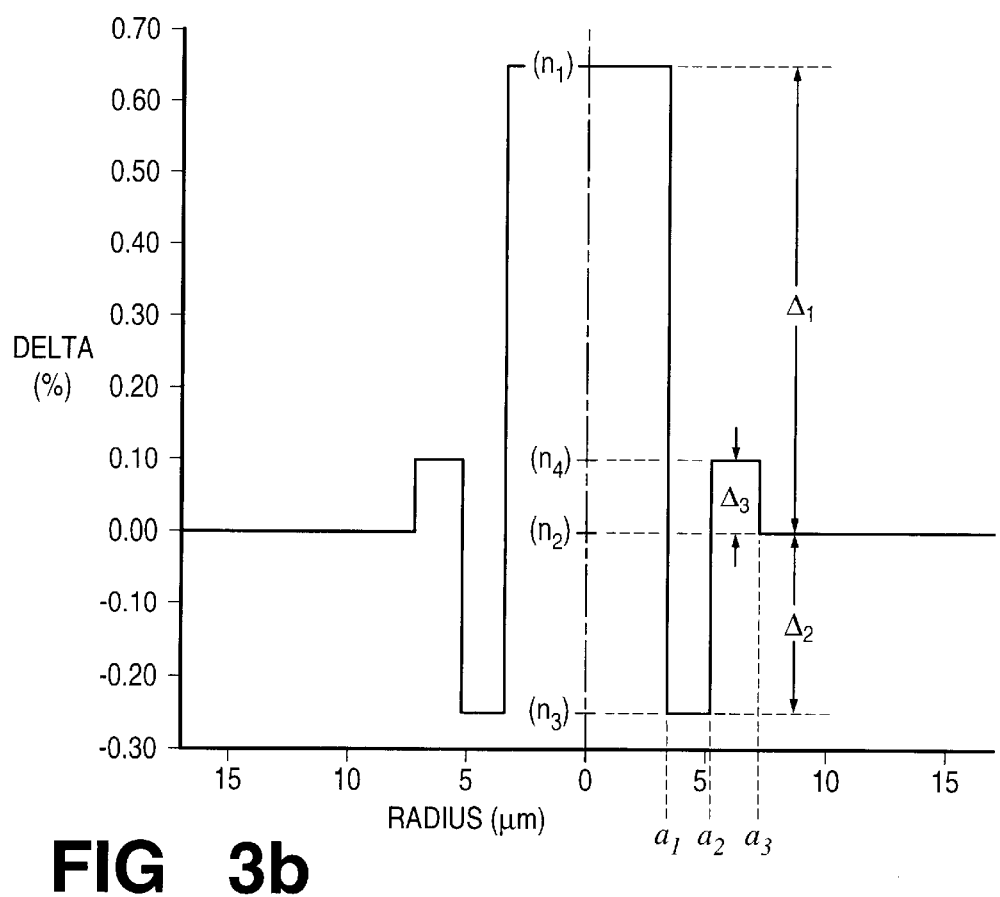

Referring now to FIG. 3b, shown is a refractive index profile, e.g., for the refractive index profile of a fiber having an arrangement corresponding to that of the fiber 30 shown in FIG. 3a. Rather than graphing the refractive-index profile using the actual values of the index of refraction, it is convenient and conventional to show the refractive-index profile as a function of normalized refractive-index differences $\Delta_1$, $\Delta_2$, and $\Delta_3$, which are defined as follows: $\Delta_1 \approx (n_1-n_2)/n_2 \times 100\%$, $\Delta_2 \approx (n_{3-n2})/n_2 \times 100\%$, and $\Delta_3 = (n_4-n_2)/n_2 \times 100\%$. With respect to the refractive index profile, the area corresponding to the first region 32 in FIG. 3a has an outer radius $a_2$ and an inner radius is $a_1$. The area corresponding to the second region 33 has an outer radius $a_3$ and an inner radius $a_2$. In this particular conventional arrangement, $\Delta_1=0.65$, $\Delta_2=-0.25$ and $\Delta_3=0.10$. Also, in this particular arrangement, $a_1=3.4$ μm, $a_2=5.2$ μm, and $a_3=7.2$ μm. Thus, the width of the first region 32 is 1.8 μm (5.2 μm–3.4 μm), and the width of the second region 33 is 2.0 μm (7.2 μm–5.2 μm).

The refractive-index profile shown in FIG. 3b typically comprises a silica core doped with germanium or other suitable material, a first annular ring or region doped with fluorine or other suitable material, a second annular ring or region doped with germanium or other suitable material, and a pure silica outer cladding. Typically, doping silica with germanium or similar material increases the index of refraction of the resulting doped material, and doping silica with fluorine or similar material decreases the index of refraction of the resulting doped material.

Figure 4A:
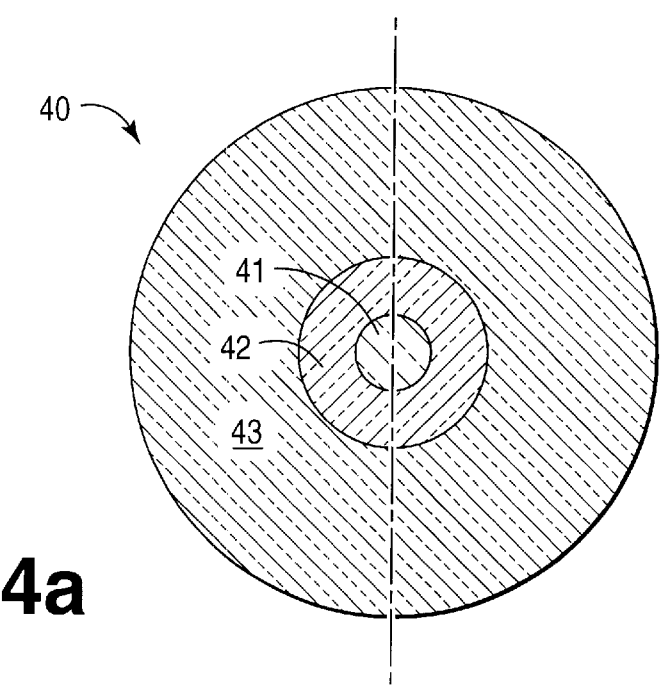
FIG. 4a is a cross-section view of another uncoated optical fiber, showing several layers of different refractive index materials.
Figure 4B:
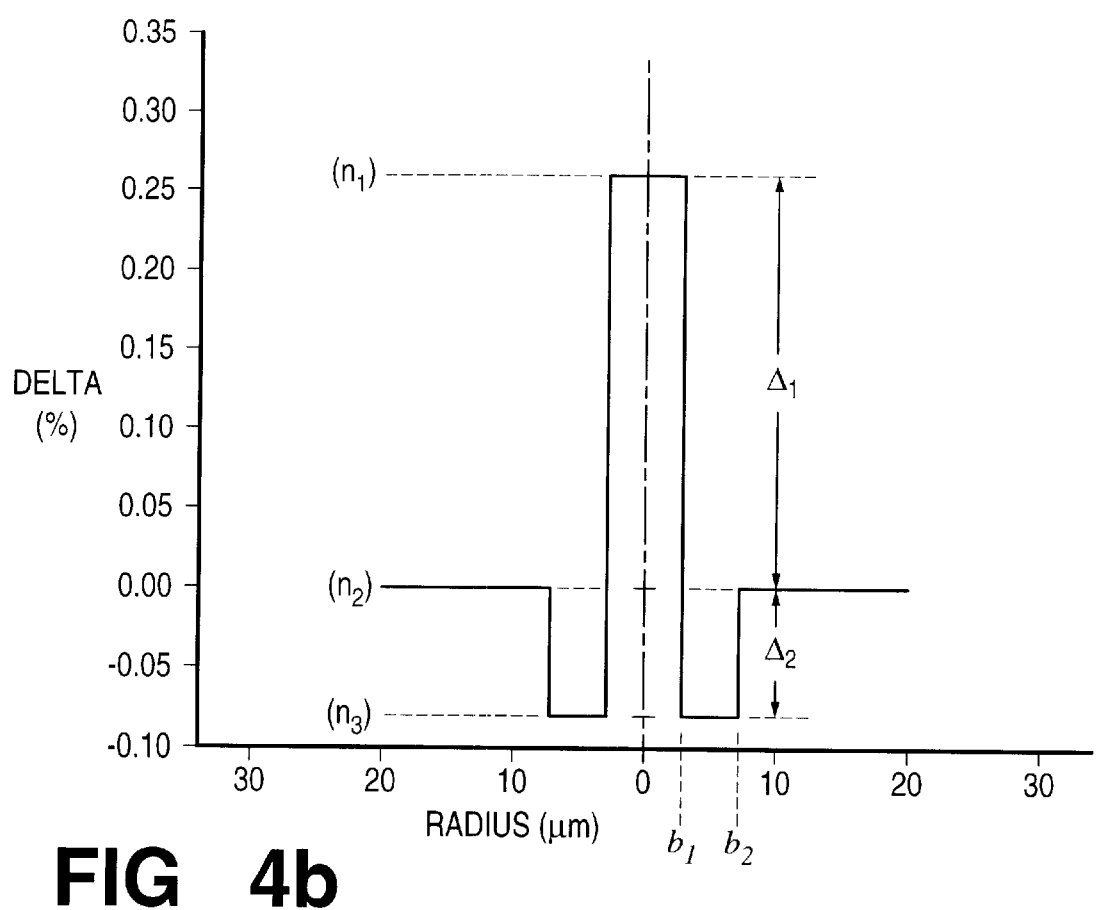

Although the silica core in FIG. 3b typically is, e.g., a germanium-doped region, it is possible for the core region of an optical fiber to be made from pure silica, with the first and second annular regions and the cladding region having levels of reduced indices of refraction, e.g., through the use of different doping levels of fluorine or other suitable material. For example, referring now to FIGS. 4a–b, shown is a cross-sectional view (FIG. 4a) and corresponding refractive index profile (FIG. 4b) of an uncoated glass fiber 40, e.g., the pure silica core fiber of Sumitomo Electric Industries, Ltd. disclosed in "Ultra Low Nonlinearity Low Loss Pure Silica Core Fiber," Electronics Letters Online No: 19991094, Aug. 3, 1999. In this conventional arrangement, the optical fiber 40 includes a central core region 41, with an index of refraction $n_1$, surrounded by a first annular ring 42, with a nominal refractive index $n_3$. The first annular ring 42 is surrounded by a second annular ring 43, which has a nominal refractive index $n_4$. The second annular ring 43 is surrounded by an outer cladding 44, which has a nominal refractive index $n_2$. More specifically, in this specific arrangement, the values of $n_1$, $n_2$, $n_3$ and $n_4$ are such that $\Delta_1=0.26\%$ and $\Delta_2=0.08\%$. Also, the ratio of the $b_2$ to $b_1$ is 2.5.

Although many conventional optical fiber index profiles have a conventional core profile comprising a germanium-doped silica core, one or more fluorine-doped intermediate layers, and a pure silica outer cladding, the index profile of the Sumitomo fiber shown in FIGS. 4a–b comprises a pure silica core, a fluorine-doped intermediate layer and a fluorine-doped outer cladding. The intermediate layer index of refraction ($n_3$) is less than the outer cladding index of refraction ($n_2$), thus the intermediate layer is doped more heavily with fluorine than the outer cladding. However, as discussed previously herein, optical fibers with pure silica cores have a number of disadvantages. For example, pure silica is more difficult and thus more expensive to process than doped silica. Also, fabricating the fluorine-doped cladding is more difficult. For example, Rod-In-Tube (RIT) overclad tubes that are compatible with pure silica core fibers are more difficult to manufacture and/or obtain, and thus are more expensive. That is, overclad tubes (down) doped with fluorine or other suitable material are more difficult to obtain than, e.g., the pure silica overclad tubes used with more conventional, germanium-doped silica cores.

Figure 5A:
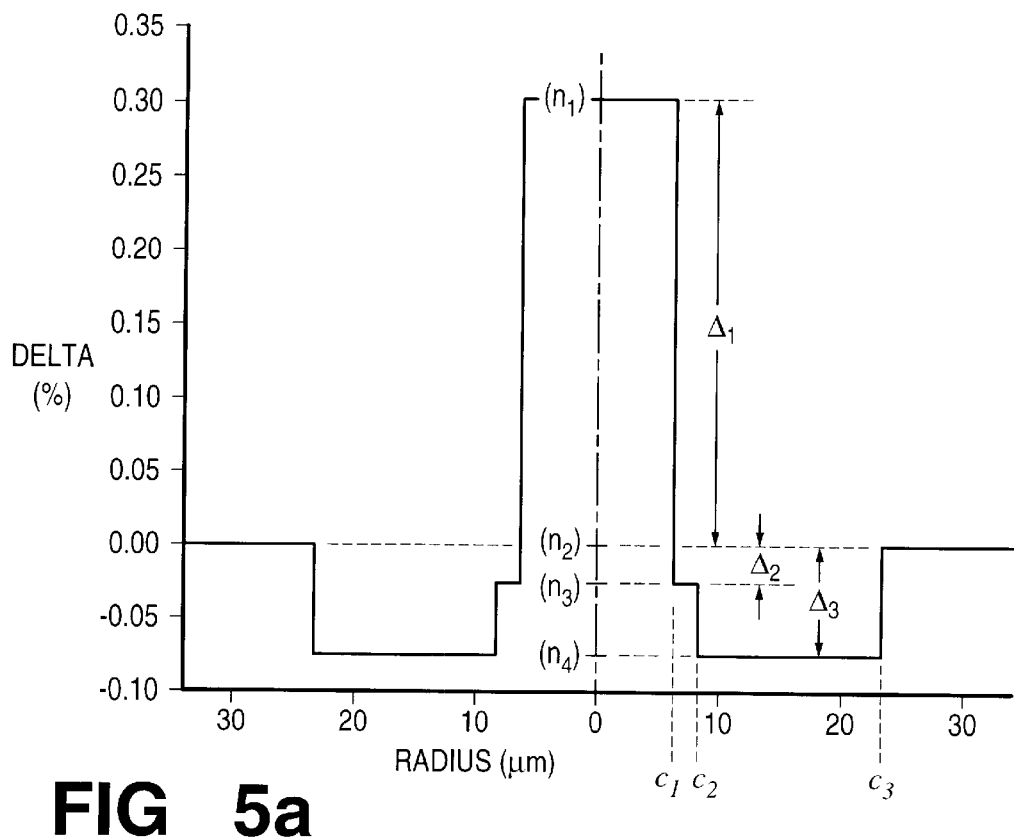
FIG. 5a is a graphical diagram of a refractive index profile of an optical fiber according to embodiments of the invention.

Referring now to FIG. 5a, shown is the refractive index profile of an optical fiber according to embodiments of the invention. The inventive profile comprises a doped-silica core region, a first annular ring or region having an index of refraction less than that of the core region, a second annular ring or region having an index of refraction less than that of the first region, and an outer cladding having an index of refraction greater than those of the first and second regions but less than that of the core region. The first region (annular ring) has an outer radius $c_2$ and an inner radius is $c_1$. The second region (annular ring) has an outer radius $c_3$ and an inner radius $c_2$. For example, the fiber profile reflects an arrangement comprising a germanium-doped silica core, a first fluorine-doped region surrounding the core region, a second fluorine-doped region surrounding the first region, and a pure silica outer cladding surrounding the second region. Alternatively, the core region is co-doped with germanium and fluorine, or with other suitable co-dopants. Also, alternatively, one or more of the first and second regions is co-doped with germanium and fluorine, or with other suitable co-dopants.

According to embodiments of the invention, the inventive refractive index profile provides a positive dispersion optical fiber with a relatively large effective transmission area (i.e., effective core area, $A_{eff}$) and transmission characteristics at least as desirable as conventional fibers, but without the disadvantages of those same conventional fibers, e.g., as discussed hereinabove. For example, according to embodiments of the invention, as shown in FIG. 5a, $\Delta_1=0.303$, $\Delta_2=-0.026$ and $\Delta_3=-0.075$. Also, in this particular arrangement, $c_1=6.343$ μm, $c_2=8.343$ μm, and $c_3=23.343$ μm. Thus, the width of the first annular ring is 2.000 μm (8.343 μm–6.343 μm), and the width of the second annular ring is 15 μm (23.343 μm–8.343 μm).

Figure 5B:
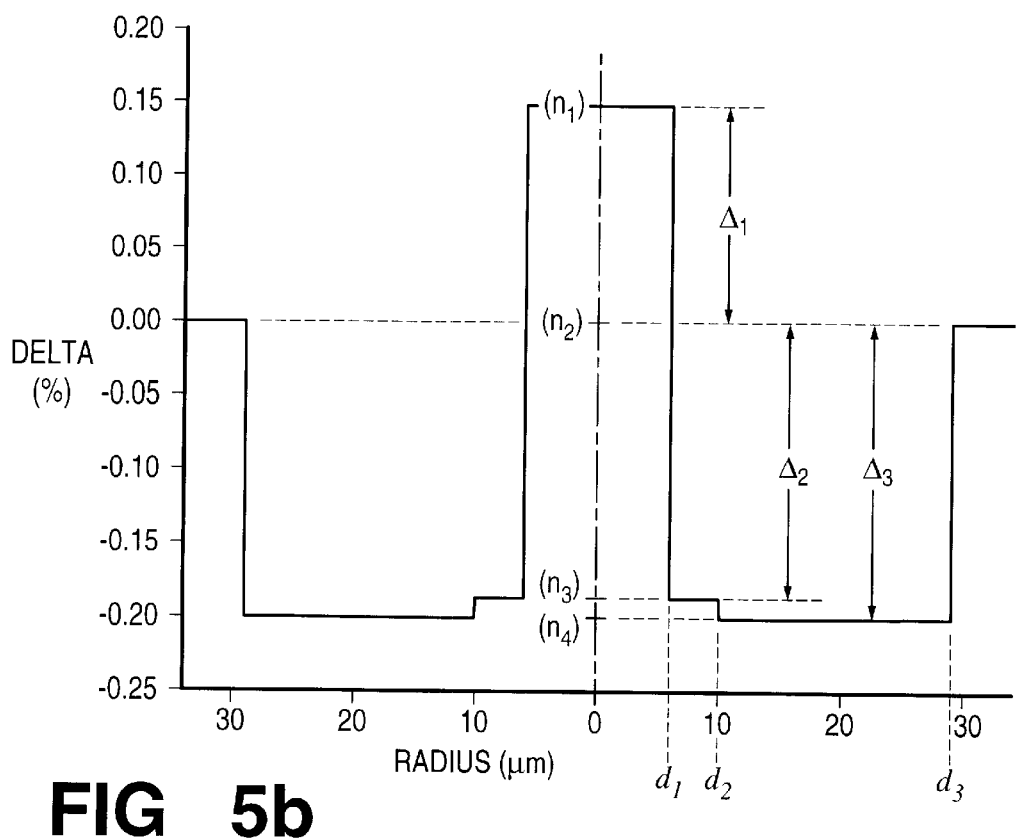
FIG. 5b is a graphical diagram of a refractive index profile of an optical fiber according to other embodiments of the invention.

Also, referring now to FIG. 5b, shown is the refractive index profile of an optical fiber according to other embodiments of the invention. Like the profiles of the previously-discussed embodiments of the invention, the fiber profile shown in FIG. 5b has a doped-silica core, a first region with an index of refraction less than that of the core region, a second region with an index of refraction less than that of the first region, and an outer cladding with an index of refraction greater than those of the first and second regions and less than that of the core region. Also, the first region has an outer radius $d_2$ and an inner radius is $d_1$. The second region has an outer radius $d_3$ and an inner radius $d_2$. As shown in FIG. 5b, $\Delta_1=0.148$, $\Delta_2=-0.187$ and $\Delta_3=-0.200$. Also, in this particular arrangement, $d_1=6.00$ μm, $d_2=10.013$ μm, and $d_3=29.013$ μm. Accordingly, the width of the first region is 4.013 μm (10.013 μm–6.00 μm), and the width of the second region is 19.000 μm (29.013 μm–10.013 μm).

Although the previous discussions of embodiments of the invention shown in FIGS. 5a–b disclose specific values, it should be noted that, according to embodiments of the invention, the fiber qualities described are obtainable over a range of values for $\Delta_1$, $\Delta_2$ and $\Delta_3$, wherein:

$0.14 < \Delta_1 < 0.31$;

$-0.19 < \Delta_2 < -0.02$; and $-0.20 < \Delta_3 < -0.08$.

Also, for example, in this manner, the radius of the core region is between approximately 6.0 μm and approximately 6.4 μm, the width of the first region is between approximately 2.0 μm and approximately 4.1 μm, and the width of the second region is between approximately 15.0 μm and approximately 35.0 μm. Thus, the value of $c_1$ and/or $d_1$ is between approximately 6.0 μm and approximately 6.4 μm, the value of $c_2$ and/or $d_2$ is between approximately 8.0 μm and approximately 10.5 μm, and the value of $c_3$ and/or $d_3$ is between approximately 23.0 μm and approximately 45.5 μm.

Fiber arrangements according to embodiments of the invention exhibit a chromatic dispersion having a magnitude greater than 20±0.2 ps/(nm-km) and a dispersion slope less than 0.062 ps/(nm²-km), at a wavelength of 1550 nm. Moreover, such fiber arrangements have a mode field diameter (MFD) of at least approximately 11.9±0.7 μm at a wavelength of 1550 nm, and the effective core area, $A_{eff}$, is greater than 100 μm² (e.g., 106 μm²) at a wavelength of 1550 nm. Also, the relative dispersion slope (RDS), which is the dispersion slope (at 1550 nm) divided by the dispersion (at 1550 nm), is less than 0.0032 nm⁻¹.

A specification table for a positive dispersion optical fiber according to embodiments of the invention has been developed. However, the table is not intended to define the entire range of acceptable fibers and is presented only for illustrative purposes.

| ILLUSTRATIVE FIBER SPECIFICATION TABLE | |
|---|---|
| Effective core area ($A_{eff}$) | >100 μm² (average) |
| Dispersion at 1550 nm | 20 ± 0.2 ps/(nm-km) |
| Dispersion slope | <0.062 ps/(nm²-km) (average) |
| Relative dispersion slope (RDS) | <0.0032 nm⁻¹ (average) |
| Attenuation at 1550 nm | ≦0.192 dB/km (average) |
| Mode field diameter (MFD) | ≧11.9 ± 0.7 microns (1550 nm) |
| Cutoff wavelength ($\lambda_c$) | <1530 nm (2 m reference length) |
| Macrobending | <0.45 dB/km (16 mm) |
| | <0.033 dB at 1550 nm (1 turn, 20 mm) |
| Microbending | <0.043 dB/km |
| | <0.001 dB at 1550 nm (100 turns, 50 mm) |

Figure 6:
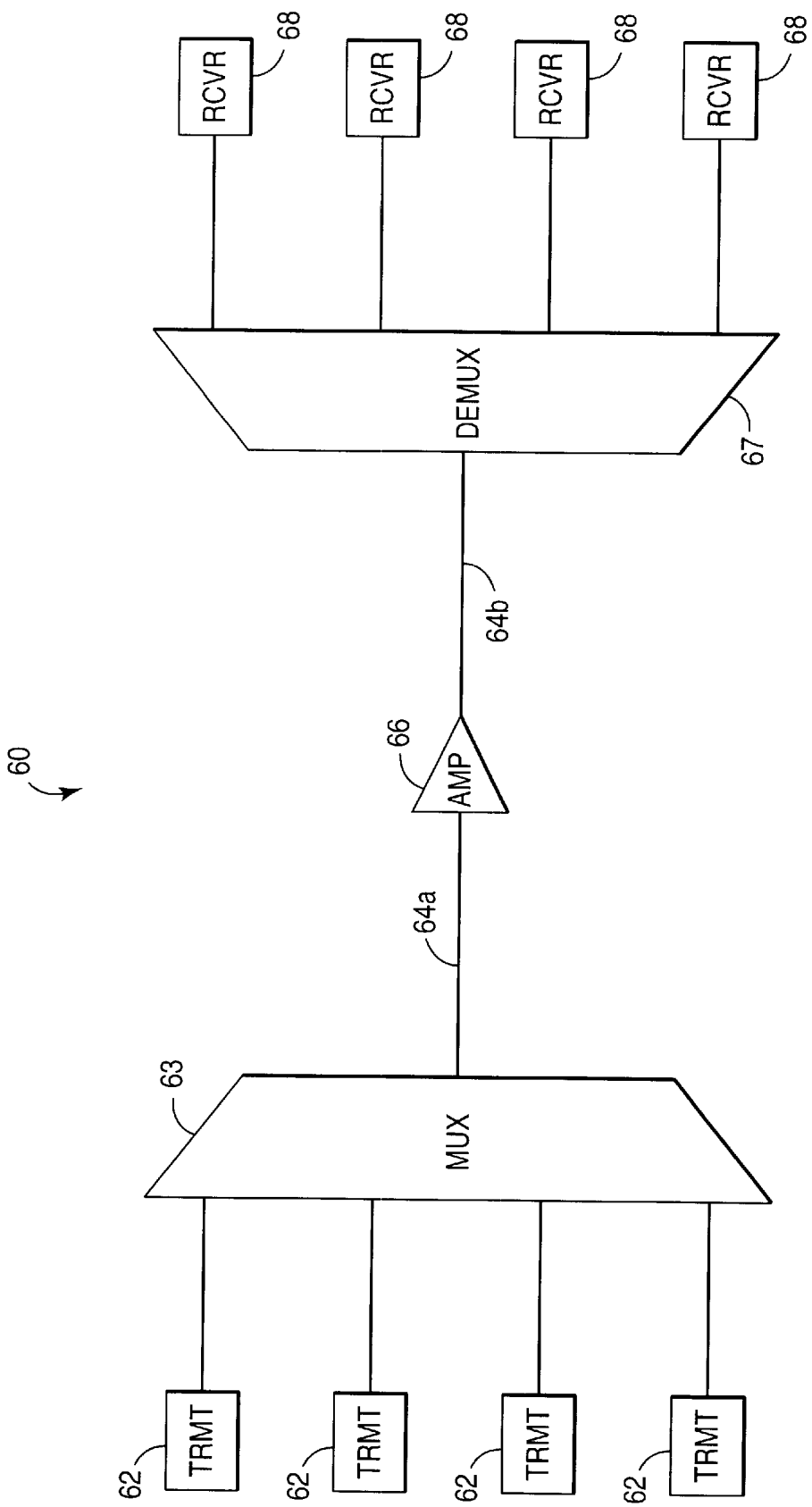
FIG. 6 is a simplified schematic diagram of an optical system in which embodiments of the invention are useful.

Referring now to FIG. 6, shown is a simplified schematic diagram of an optical system 60 in which embodiments of the invention are useful. The optical communications system 60 includes one or more optical sources or transmitters 62, which modulate wavelengths, e.g., in the 1530–1565 nm region with different baseband signals. The modulated wavelengths are combined, e.g., via a multiplexer 63 or other suitable coupler, and introduced into a fiber transmission line combination $64_a$–$64_b$, which includes, e.g., an optical amplifier 66 therebetween. The fiber transmission line combination $64_a$–$64_b$ comprises, e.g., a dispersion compensating arrangement including a positive dispersion fiber such as the optical fiber according to embodiments of the invention (e.g., fiber transmission line $64_a$) and a dispersion compensating fiber (e.g., fiber transmission line $64_b$). At the receiver end, the transmitted optical channels are split, e.g., by a demultiplexer 67, according to their wavelengths, and processed by receivers 68 to extract the individual baseband signals.

It will be apparent to those skilled in the art that many changes and substitutions can be made to the embodiments of the optical fibers herein described without departing from the spirit and scope of the invention as defined by the appended claims and their full scope of equivalents. Such changes and substitutions include, but are not limited to, refractive-index profiles that gradually taper between adjacent layers (e.g., graded-index profiles), variations in the widths of the layers, the use of different doping materials to achieve the same general profile shapes, and the use of plastic materials (rather than glass) in making the optical fiber. Also, it is noted that in many practical fibers, an index depression exists at the center of the fiber due to the manufacturing process used in making the fiber. It is understood that even though some FIGS. herein show idealized profiles, embodiments of the invention contemplate such central depressions.

What is claimed is:

1. An optical fiber communications system, comprising:
   at least one source of optical energy;
   an optical fiber cable including at least one optical fiber coupled to the at least one source for transmitting optical energy from the source,
   wherein the optical fiber includes
      a doped core region having an index of refraction $n_1$,
      a cladding region having an index of refraction $n_2$, wherein $0.14<(n_1-n_2)/n_2<0.31$,
      a first region between the doped core region and the cladding region and adjacent the doped core region, the first region having an index of refraction $n_3$, wherein $-0.19<(n_3-n_2)/n_2<-0.02$,
      a second region between the doped core region and the cladding region and adjacent the first region, the second region having an index of refraction $n_4$, wherein $-0.20<(n_4-n_2)/n_2<-0.08$, and
   at least one receiver coupled to the optical fiber for receiving optical energy from the source.

2. The system as recited in claim 1, wherein the optical fiber has a chromatic dispersion with a magnitude that is greater than 20±2.0 ps/(nm-km) at a wavelength of 1550 nm and a dispersion slope that is less than 0.062 ps/(nm²-km) at a wavelength of 1550 nm.

3. The system as recited in claim 1, wherein the optical fiber has an effective core area, $A_{eff}$, that is greater than 100.0 μm² at a wavelength of 1550 nm.

4. The system as recited in claim 1, wherein the optical fiber has a mode field diameter (MFD) that is greater than 11.9±0.7 μm at a wavelength of 1550 nm.

5. The system as recited in claim 1, wherein the radius of the doped core region is within the range from approximately 6.0 μm to approximately 6.4 μm, the width of the first region is within the range from approximately 2.0 μm to approximately 4.1 μm, and the width of the second region is within the range from approximately 15.0 μm to approximately 35.0 μm.

6. An optical fiber, comprising:
   a doped core region having an index of refraction $n_1$;
   a cladding region having an index of refraction $n_2$;
   a first region between the doped core region and the cladding region and adjacent the doped core region, the first region having an index of refraction $n_3$; and
   a second region between the doped core region and the cladding region and adjacent the first region, the second region having an index of refraction $n_4$,
   wherein $0.14<(n_1-n_2)/n_2<0.31$, $-0.19<(n_3-n_2)/n_2<-0.02$, and $-0.20<(n_4-n_2)/n_2<-0.08$.

7. The fiber as recited in claim 6, wherein the optical fiber has a chromatic dispersion with a magnitude that is greater than 20±2.0 ps/(nm-km) at a wavelength of 1550 nm.

8. The fiber as recited in claim 6, wherein the optical fiber has a dispersion slope that is less than 0.062 ps/(nm²-km) at a wavelength of 1550 nm.

9. The fiber as recited in claim 6, wherein the optical fiber has a mode field diameter (MFD) that is greater than 11.64 μm at a wavelength of 1550 nm.

10. The fiber as recited in claim 6, wherein the optical fiber has an effective core area, $A_{eff}$, greater than 100.0 μm² at a wavelength of 1550 nm.

11. The fiber as recited in claim 6, wherein the radius of the doped core region is within the range from approximately 6.0 μm to approximately 6.4 μm.

12. The fiber as recited in claim 6, wherein the width of the first region is within the range from approximately 2.0 μm to approximately 4.1 μm.

13. The fiber as recited in claim 6, wherein the width of the second region is within the range from approximately 15.0 μm to approximately 35.0 μm.

14. The fiber as recited in claim 6, wherein the doped core region is made of a material selected from the group consisting of a germanium-doped silica material and a germanium and fluorine co-doped silica material.

15. The fiber as recited in claim 6, wherein at least one of the first and second regions is made of a material selected from the group consisting of a fluorine-doped silica material and a germanium and fluorine co-doped silica material.

16. The fiber as recited in claim 6, further comprising at least one coating layer formed around the second cladding region.

17. The fiber as recited in claim 6, wherein the optical fiber has a relative dispersion slope (RDS) less than 0.00310 nm$^-$.

18. Method for making an optical fiber, comprising the steps of:

forming a doped core region having an index of refraction $n_1$;

forming a first region around the doped core region, the first region having an index of refraction $n_3$;

forming a second region around the first region, the second region having an index of refraction $n_4$; and forming a cladding region around the second region, the cladding region having an index of refraction $n_2$, wherein the doped core region, the cladding region, the first region and the second region are formed in such a way that $0.14<(n_1-n_2)/n_2<0.31$, $-0.19<(n_3-n_2)/n_2<-0.02$, and $-0.20<(n_4-n_2)/n_2<-0.08$.

19. The method as recited in claim 18, wherein the doped core region is formed with a radius within the range from approximately 6.0 μm to approximately 6.4 μm.

20. The method as recited in claim 18, wherein the first region is formed with a width within the range from approximately 2.0 μm to approximately 4.1 μm.

21. The method as recited in claim 18, wherein the second region is formed with a width within the range from approximately 15.0 μm to approximately 35.0 μm.

22. An optical fiber preform, comprising:

a doped core region having an index of refraction $n_1$;

a cladding region having an index of refraction $n_2$;

a first region between the doped core region and the cladding region and adjacent the doped core region, the first region having an index of refraction $n_3$; and a second region between the doped core region and the cladding region and adjacent the first region, the second region having an index of refraction $n_4$, wherein $0.14<(n_1-n_2)/n_2<0.31$, $-0.19<(n_3-n_2)/n_2<-0.02$, and $-0.20<(n_4-n_2)/n_2<-0.08$.

* * * * *